Sept. 11, 1923.

C. H. SCHURR

INDEXING MECHANISM

Filed May 31, 1921

Inventor
Charles H. Schurr

By
Attorney

Sept. 11, 1923.

C. H. SCHURR

INDEXING MECHANISM

Filed May 31, 1921

Sept. 11, 1923.                        1,467,985
C. H. SCHURR
INDEXING MECHANISM
Filed May 31. 1921          3 Sheets-Sheet 3

Patented Sept. 11, 1923.

1,467,985

UNITED STATES PATENT OFFICE.

CHARLES H. SCHURR, OF CLEVELAND, OHIO, ASSIGNOR TO THE LEES-BRADNER COMPANY, OF CLEVELAND, OHIO, A CORPORATION OF OHIO.

INDEXING MECHANISM.

Application filed May 31, 1921. Serial No. 473,357.

*To all whom it may concern:*

Be it known that I, CHARLES H. SCHURR, a citizen of the United States, residing at Cleveland, in the county of Cuyahoga and State of Ohio, have invented certain new and useful Improvements in and Relating to Indexing Mechanism, of which the following is a specification.

This invention relates to an indexing mechanism for an apparatus for shaping, grinding or cutting blanks, such as gears, gear blanks and cutters for gears and the like.

By way of example the invention is shown as applied to one form of apparatus for grinding gears according to the involute system. It may be adapted to apparatuses of different constructions, one example of which is shown in Letters Patent No. 1,390,145, to Ernest J. Lees, dated September 6, 1921.

One object of the invention is to provide an indexing mechanism of relatively few elements, but capable of operating positively and accurately to rotate the blank or work-piece a predetermined distance at each operation.

Another object of the invention is to provide an improved indexing mechanism one element of which is interposed between and adapted to be alternately connected to the work-piece spindle and the slide of the apparatus to control and permit indexing at predetermined intervals.

Another object of the invention is to provide, in a cutting or grinding machine, an automatic indexing mechanism all the elements of which are carried by the slide of the machine.

Other objects of the invention will be apparent to those skilled in the art to which my invention relates from the following description taken in connection with the accompanying drawings.

For the purpose of illustration, I have shown and herein described one form of mechanism embodying my invention.

Figure 2:
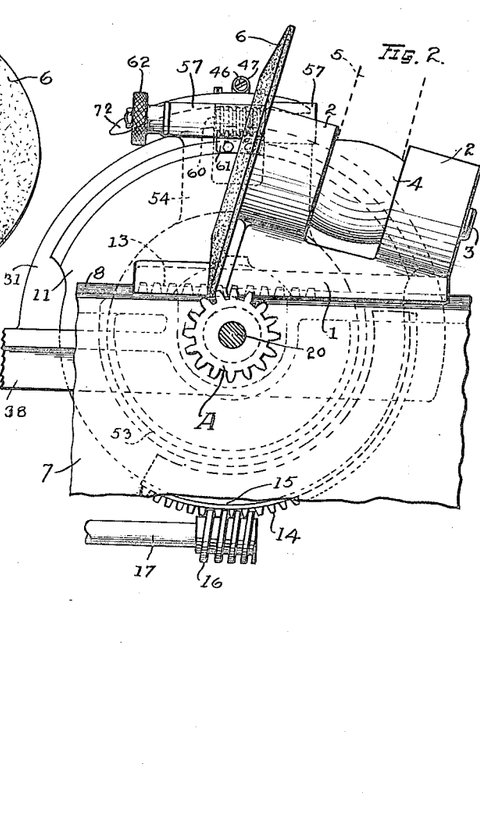
Fig. 2 is a section on the line 2—2 of Fig. 1.

Referring to the drawings, 1 indicates the frame of the apparatus, only a portion of which is shown in the drawings. At 2, the frame 1 is provided with a pair of bearings to support a shaft 3. The bearings 2 are preferably spaced relatively to each other to receive between them a pulley 4. The pulley 4 is fixed to the shaft 3 and driven by a belt 5—see dotted lines in Fig. 2. 6 indicates a tool connected in a well-known manner to the shaft 3. The bearings 2 are arranged in an inclined position so that the tool 6 may be supported by the shaft 3 at the proper angle for well-known purposes. The bearings 2 or their support may be made adjustable for well-known reasons. The tool 6 preferably comprises an emery wheel, one surface of which is planular, for grinding the teeth of the work piece or blank, such as a gear or gear blank A.

7 indicates a slide supported on the frame 1 and engaging suitable guides, certain of which are shown at 8. 9 indicates a journal or bearing provided on the slide 7 and arranged to rotatably support the sleeve or hub 10 of a disk 11, which is preferably integrally connected to the outer end of the hub 10. 12 indicates a pinion formed integrally with, or otherwise connected to, the inner end of the hub 10, and adapted to mesh with a rack 13 fixed to the frame 1 in a well-known manner, to cause movement of the slide when the pinion 12 is rotated.

14 indicates a curved rack or gear segment provided on an arcuate member 15 fixed in any desired manner to the disk 11.

16 indicates a worm carried by a shaft 17 and meshing with the gear 14. The shaft 17 forms one element of a suitable mechanism (not shown), which automatically drives the shaft 17 first in one direction and then in the opposite direction; hence the disk 11 and hub 10 and pinion 12 connected thereto are rotated first in one direction and then in the other direction, and such operation causes a co-action between the pinion 12 and rack 13, whereby the slide is reciprocated in its guides 8. As a result, it will be understood that the disk 11 and hub 10 are given a compound rotational and slide movement in first one direction and then in the reverse direction.

18 indicates a work piece spindle extending through and rotatably supported in the hub 10. The inner end of the spindle 18 preferably extends through a supplemental bearing 19 formed in the slide 7. The inner free end of the spindle 18 may be reduced, as shown at 20. The gear A is mounted on the reduced end 20, being preferably supported fixedly thereon between two washers 21, 21, (the inner one of which rests against the shoulder 22 formed by the reduced end 20) by a nut 23 engaging screw threads 24 provided on the end 20.

In operation, the tool 6 serves to grind the working face of each tooth as the gear A rotates clockwise and bodily moves to the left (as viewed in Figs. 8 and 9) and then in the reversed directions, respectively; but during the last part of the movements clockwise and bodily to the left and the first portion of the movements of the gear A anticlockwise and toward the right, I index the gear A, preferably one tooth, by mechanism indicated as an entirety at 25, in order to bring a new tooth into position for grinding by the tool 6.

Of this indexing mechanism, 26 indicates a plate having a hub 27 secured on the outer end of the work piece spindle 18. As clearly shown in Fig. 6, the outer end of the spindle 18 is conical shaped and the opening in the hub 27 is correspondingly shaped so that it may be rigidly secured thereto by a nut 28, engaging screw threads provided on the outer free end of the spindle 18. The hub 27 is preferably provided with an annular boss or collar 28′ which rotatably fits into a bearing 30 formed in a guide plate 31.

Figure 1:
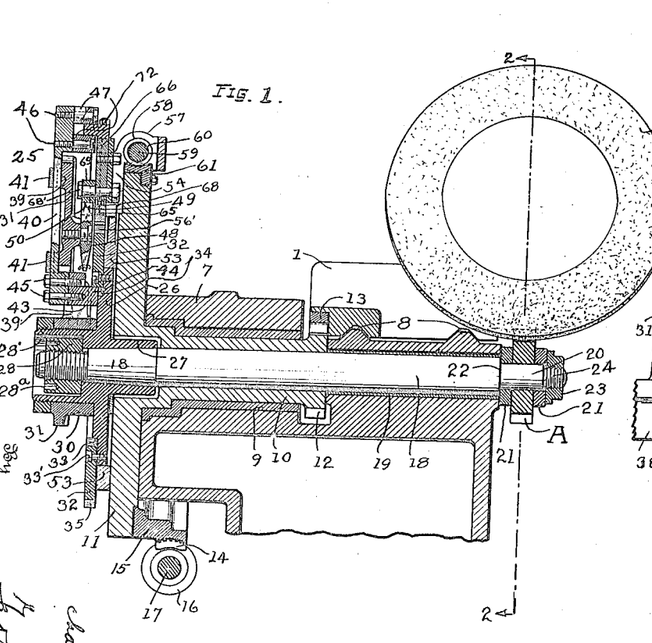
Figure 1 is a fragmentary view partly in section of a gear grinding apparatus provided with an indexing mechanism embodying my invention.
Figures 3, 4, 6:
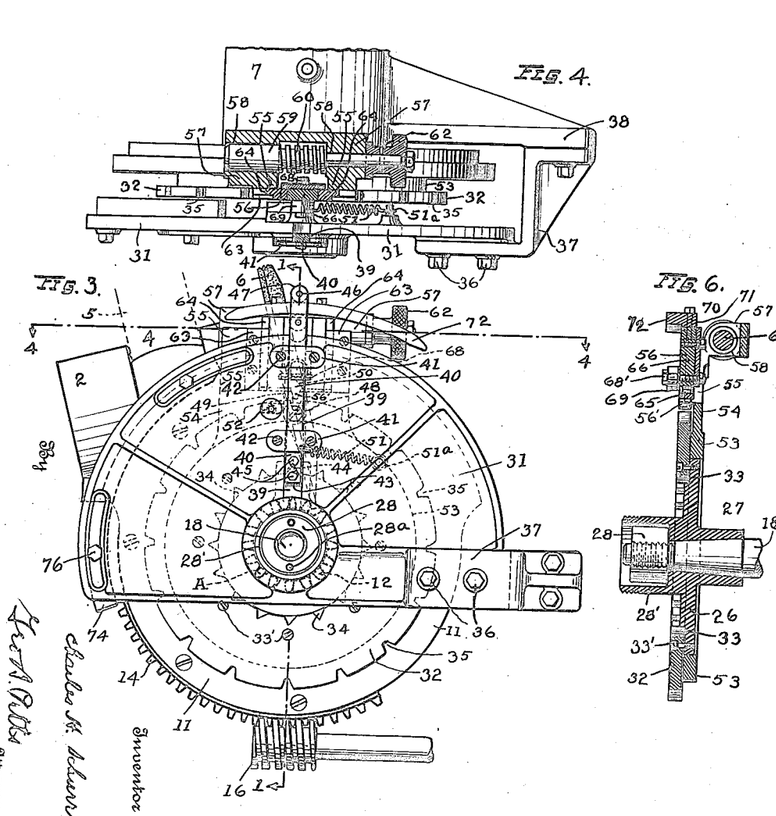
Fig. 3 is a view of the parts shown in Fig. 1, looking toward the right.
Fig. 4 is a section on the line 4—4 of Fig. 3.
Fig. 6 is a section on the line 6—6 of Fig. 5.

32 indicates an annular member arranged concentrically to the axis of the spindle 18 and secured to one face (preferably the outer face) of the plate 26. As shown in Figs. 1 and 6, the plate 26 is formed with a seat 33 to receive a portion of the inner circumferential edge of the member 32. The member 32 may be removably secured to the plate 26 in any desired manner, for example, by cap screws 33′. 34, 35, indicate series of notches or recesses formed in the inner and outer circumferential edges, respectively, of the member 32. As shown, the notches of each series are uniformly spaced around the member 32 and each notch 35 is aligned with a notch 34 and each pair of aligned notches is disposed in a line extending radially of the axis of the spindle 18; furthermore, the number of notches in each series 34, 35, corresponds to the number of teeth in the blank A, for reasons which will hereinafter appear.

The guide plate 31 is secured in a well-known manner (for example by cap screws 36) to a bracket 37, which in turn is secured to an arm 38 integrally connected with the slide 7. The nut 28 may be provided with openings 28ª to permit its engagement and operation by a suitably constructed tool.

39 indicates a guide way formed in the guide plate 31 and arranged to slidably support a slide member 40. The guide way 39 preferably extends radially of the axis of the spindle 18. 41 indicates a pair of plates that bridge the guide way 39 and serve to maintain the slide member 40 therein. The plates 41 may be secured to the frame or plate 31 by screws 42. At its lower end the slide member 40 carries an inwardly extending block 43 having a V-shaped tooth 44 on its upper surface which serves as a dog to engage the notches 34 successively, in the manner to be later set forth, to lock the annular member 32 against movement relative to the frame or guide plate 31. The block 43 may be rigidly secured to the slide member 40 by a plurality of cap screws 45. At its upper end the slide member 40 carries a pair of spaced screws 46 which serve as stud shafts for a pair of rollers 47, the purpose of which will be later set forth.

48 indicates a pivot pin or stud shaft extending laterally from the inner face of the plate 31 and arranged to pivotally support a controlling element 49, having a cam portion 50 at its upper end. 51 indicates a coiled spring connected to the lower end of the controlling element at one end and at its other end connected to the plate 31 as shown at 51ª. The spring 51 serves normally to maintain the upper end of the controlling element 49 in the position shown in Fig. 10 against a stop 52 carried by the plate 31, but permits it to swing or rotate about the pivot 48, as shown in Fig. 9, as will be later set forth.

53 indicates a ring or collar rotatably fitting the circumferential edge of the plate 26 and disposed between the opposing faces of the annular member 32 and disc 11. At one side the ring is provided with an integral extension 54. The extension 54 is cut away at its central portion to form a pair of guides 55, which slidably support a locking member 56 adapted to engage the annular member 32, as will be later described. At their upper ends, the guides 55 are provided with a pair of arms 57 (preferably formed integral with the guides 55) which extend laterally and are formed with openings 58. The openings 58 form bearings for a shaft 59 carrying a worm 60, meshing with a gear or gear segment 61 provided on the disc 11 (see Fig. 1). The shaft 59 is provided at one end with a knob or hand wheel 62, whereby it may be readily turned. The worm 60, gear 61, the ring 53 or its arm 54, the locking member 56 and the annular member 32 serve as a connection between the disc 11 and plate 26, by rotating the shaft 59 and the plate 26 and through it the spindle 18 may be adjusted to move the blank A into proper grinding position for engagement by the tool 6, such adjustment being usually required when the blank A is first connected to the spindle end 20. The guides 55 consist of longitudinal channels 55' closed on their outer sides by strips 63 to form the guide ways which receive the projecting ribs 64 provided on the locking member 56. The locking member 56 preferably comprises a pair of relatively movable elements 65, 66, to permit the proper engagement between it and the annular member 32, and a locking dog 56' projecting from the lower end of the elements 65 and arranged to successively engage the notches 35 formed in the annular member 32, as will be later set forth.

Figure 5:
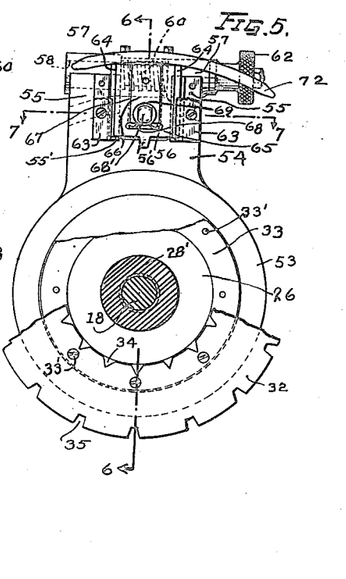
Fig. 5 is a fragmentary view of certain elements of the indexing mechanism.
Figure 7:
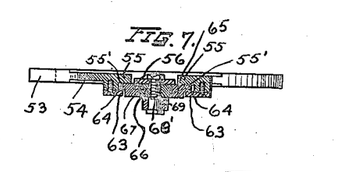
Fig. 7 is a section on the line 7—7 of Fig. 5.
Figures 8, 9, 10, 11, 12:
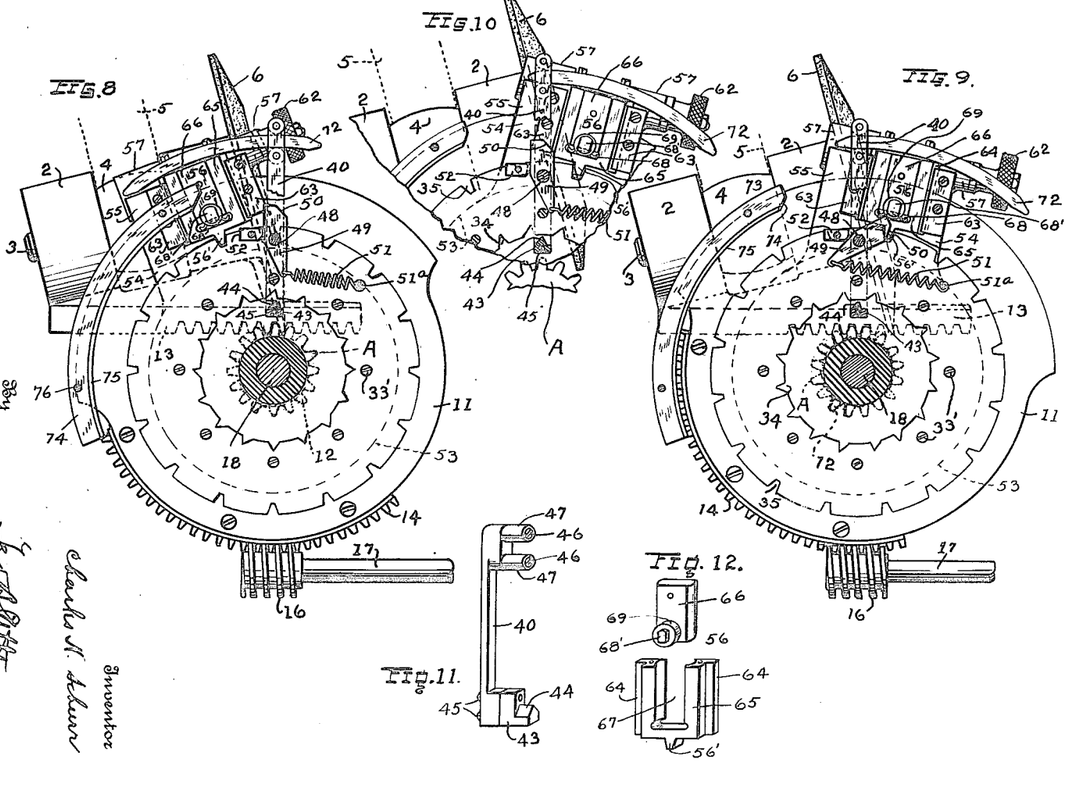
Figs. 8, 9 and 10 are fragmentary detailed views showing the indexing mechanism in different positions to illustrate its operation.
Figs. 11 and 12 are perspective views of certain of the elements for effecting indexing of the work-piece carrying member.

As shown in Figs. 5 and 7, the element 65 is cut away at its central portion to form a recess 67 in which the element 66 is mounted, the side walls of the element 66 and recess 67 being curved (see Fig. 7) to form slide surfaces and guides for the element 66. 68 is a spring—preferably a flat spring —interposed between the lower end of the element 66 and bottom wall of the recess 67, for a purpose presently to be described. 68' indicates a stud shaft projecting outwardly from the locking element 66 and carrying a roller 69 disposed in the plane of the controlling element 49, so that it may engage with and ride up the cam 50 when the ring 53 and arm 54 move anti-clockwise, as viewed in Figs. 8, 9 and 10. 70 indicates an elevating member carried by the locking member 56. The elevating member 70 preferably comprises a base or body portion 71, which is secured to the outer or free end of the element 65, and a flange 72, which extends between and engages the spaced rollers 47 carried by the slide member 40. The base or body portion 71 extends across the recess 67 and is disposed in the path of movement of the element 66 outwardly so that when the roller 69 rides the cam 50, the element 66 will engage with and elevate the body portion 71 and through it lift the element 65 (see Fig. 3), thus disengaging the locking dog 56' from the adjacent notch 35. As the flange 72 is in engagement with the upper roller 47, this operation will also elevate or move the slide member 40 endwise and through the latter cause engagement of the dog 44 with the adjacent aligned notch 34, thereby locking the annular member 32 to the guide plate 31. After the roller 69 rides the cam 50 and the upper end of the controlling member 49, the locking member 56 will drop, under the influence of gravity, into engagement with the circumferential edge of the annular member 32 and will ride thereon as the disc 11 continues moving anti-clockwise until the locking member registers with the next succeeding notch 35, at which time the locking member 56 will drop or move downwardly therein; and this operation in turn will release or unlock the dog 44 from the adjacent notch 34 and free the member 32 from the plate 31 ready for operation by the locking member 56. It will thus be understood that when the annular member 32 is unlocked or released from the ring 53, it is locked to the guide plate 31, through the dog 44 and slide 43, and when the member is unlocked from the plate 31, it may be locked to the ring 53 and through it to the disc 11 to effect indexing. The flange 72 is curved on an arc struck from the axis of the spindle 18 and is of a length equal to or greater than the distance traversed by the arm 54. As a result of this construction, the slide member 40 is operatively connected to the locking member 56 at all times. This connection insures positive co-operation between the dogs 44 and 56' to alternately engage the annular member 32.

The grinding operation by the tool 6 on each tooth is effected while the gear A is rotating clockwise and the slide is moving toward the left as viewed in Figs. 8, 9 and 10 and back again in the opposite directions. The gear 14, the worm 16 and the operating mechanism for the latter are correlated to so operate the spindle 18 that during the latter part of the movement of the slide toward the left and the first part of the movement thereof toward the right the grinding tool is out of engagement with the gear A to permit indexing thereof.

In Fig. 8, the spindle 18 is connected through the plate 26, annular member 32 and locking member 56 (the dog 56' of which is in engagement with a notch 35) to the arm 54, lugs 57, worm 60 and gear 61 to the disc 11; the disc is rotating clockwise and the slide 7 is moving toward the left; and the tool 6 is completing the grinding operation on the tooth that is in engagement therewith. As rotation of the disc 11 and the elements associated therewith continues, the roller 69 engages the controlling member 49, swinging it on its pivot 48 against the tension of the spring 51

(see Fig. 9), so that it may move to a position on the other side of the cam 50, as shown in Fig. 10. Following this operation, direction of rotation of the shaft 17 is reversed. As the disc 11 and elements associated therewith move in the opposite direction or anti-clockwise, the roller 69 will engage the cam 50 and rid upwardly thereon. This operation will elevate the locking member 56 (disengaging the dog 56' from the annular member 32) and it acting through the elevating member 70, will lift the slide member 40 and cause the dog 44 to engage the adjacent notch 34, thus locking the annular member 32 to the guide plate 31. The roller 69 will ride on the upper end of the controlling member 49 and when it frees the member 49 it will permit the locking member 56 to drop, under the influence of gravity, upon the periphery of the member 32. As the rotation of the disk in the anti-clockwise direction continues, the dog 56' of the locking member 56 will ride on the disk 32 until it registers with the next or succeeding notch 35, at which time it will drop therein, thereby causing the disengagement of the dog 44 from the member 32, locking the disk 11 to the spindle 18, and effecting an indexing of the gear blank A one tooth.

It will be understood that during the period that the dog 56' is moving from one notch 35 to the next notch 35, the spindle 18 and gear A thereon are held against rotation by the dog 44, but as the slide 7 continues to move toward the right, the next tooth of the gear is positioned for grinding by the tool 6 upon the engagement of the dog 56' with the next notch 35.

From the foregoing description it will be seen that each gear tooth is caused to engage and disengage the tool 6; and that during their disengagement the elements comprising the indexing mechanism cause a relative movement to take place between the work piece spindle and the driving element therefor. It will also be seen that the elements comprising the indexing mechanism are carried entirely by the slide which carries the work piece spindle. It will further be seen that these elements are so correlated that they automatically effect indexing by means of a member, which controls the locking of one of the remaining elements alternately to the slide and spindle rotating means.

73 indicates a device which operates positively to move the dog 56' of the locking member 56 into each notch 35 and to maintain it therein while the grinding operations for each tooth are taking place. The device 73 preferably comprises a cam 74 and an arc shaped guide 75 arranged concentrically to the axis of the spindle 18. The cam 74 is preferably provided on the front end of the guide 75 and is so positioned relative to the notches 35 as they are successively arranged to receive the dog 56' after its disengagement from the controlling member 49, in each operation, in the path of movement of the roller 69, that it will direct the latter downwardly—that is radially toward the axis of the spindle 18—in the event the dog 56' does not engage the adjacent notch 35 under the influence of gravity acting on the locking member 56 and the elements connected to it. As will be understood from the drawings, the guide 75 being disposed in the plane in which the roller 69 moves, it will engage therewith and through it maintain the dog 56' in its notch 35 as the grinding operations continue during oscillatory movements of the disc 11. The guide 75 is preferably so disposed that it will act through the roller 69 to compress the spring 68, whereby the engagement of the dog 56' with each notch 35 will be yielding in character and thus insure a proper seating of the dog therein. The device 73 is preferably adjustably supported on the inner face of the plate 31, by cap screws 76, the openings in the plate 31 for the screws being elongated (see Fig. 1) to permit of such adjustment as may be required.

To those skilled in the art of making apparatus of the class described, many alterations in construction and widely differing embodiments and applications of my invention will suggest themselves, without departing from the spirit and scope thereof. My disclosures and the description herein are purely illustrative and are not intended to be in any sense limiting.

What I claim is:

1. In apparatus of the class described, the combination of a support, a work spindle rotatably mounted on said support, a tool, means for causing relative movement between said tool and work spindle support, means for rotating said work spindle in opposite directions, and means carried entirely by said work spindle support for indexing said work spindle.

2. In apparatus of the class described, the combination of a frame, a support slidably mounted on said frame, a work spindle rotatably mounted on said support, means for reciprocating said support and rotating said spindle in opposite directions, and means carried entirely by said support for indexing said work spindle.

3. In apparatus of the class described, the combination of a frame, a support slidably mounted on said frame, a pair of concentrically arranged members rotatably mounted on said support, means for reciprocating said support and for oscillating one of said members, and devices interposed between said support and said oscillatable member for alternately locking the other member to said support and said oscillatable member, whereby relative movement between said members is effected.

4. In apparatus of the class described, the combination of a support, a tool, a slide on said support, a pair of members rotatably mounted on said slide, one of said members being adapted to carry a work-piece, means for oscillating the other member, a notched member secured to the work-piece carrying member, a pair of devices carried by said oscillating member and slide, respectively, arranged to alternately engage said notched member and slide, whereby the notched member is locked to said oscillating member, or said slide, and means controlling the operation of said devices.

5. In apparatus of the class described, the combination of a tool, a support, a pair of connected members rotatably mounted on said support, means for rolling said members relative to said tool, one of said members carrying a work piece, and means operating periodically to disconnect the work piece carrying member from said other member and connect it to said support, to permit relative movement between said members.

6. In apparatus of the class described, the combination of a frame, a tool, a support slidably mounted on said frame, a pair of connected members rotatably mounted on said support, one of said members carrying a work piece, means for oscillating one of said members and means for moving said support, whereby the work-piece is rolled relative to said tool, and means operating periodically to disconnect the work-piece carrying member from said other member and lock it against rotation to permit relative movement between said members.

7. In apparatus of the class described, the combination of a support, a tool, a pair of connected members rotatably mounted on said support, one of said members carrying a work-piece, means for rolling said members relative to said tool, and means, including a cam, operating periodically to disconnect the work-piece carrying member from said other member and lock it to said support, to permit relative movement between said members.

8. In apparatus of the class described the combination of a support, a tool, a pair of connected members rotatably mounted on said support, one of said members being arranged to carry a work-piece, means for rolling said members, relative to said tool, and means, including a pivoted cam operating periodically to disconnect the work-piece carrying member from said other member and lock it to said support, to permit relative movement between said members.

9. In apparatus of the class described, the combination of a support having a slide, a tool, a pair of members rotatably mounted on said slide, one of said members being arranged to carry a work piece, means for rolling the other member, and devices carried by said rolling member and said slide for alternately connecting the work-piece carrying member to said slide and said rolling member to cause relative movement between said members.

10. In apparatus of the class described, the combination of a support having a slide, a tool, a pair of members rotatably mounted on said slide, means for reciprocating said slide and for oscillating one of said members to cause rolling movement of the latter relative to said tool, and devices carried by said oscillatable member and said slide for alternately connecting the other member to said slide and said oscillatable member to cause relative movement between said members, said devices including an element which controls the operation of said devices.

11. In apparatus of the class described, the combination of a support having a slide, a tool, a pair of members rotatably mounted on said slide, means for reciprocating said slide and for oscillating one of said members, whereby the latter rolls relative to said tool, and devices carried by said oscillatable member and said slide for alternately connecting the other member to said slide and said oscillatable member to cause relative movement between said members, said devices including a pivoted element which controls the operation of said devices.

12. In apparatus of the class described, the combination of a support, a pair of members rotatably mounted on said support, means for oscillating one of said members, devices operatively connected together and slidably carried by said oscillatable member and said support, respectively, and means arranged to engage one of said devices and control their engagement and disengagement with the other member, whereby the latter is alternately connected to said support and said oscillatable member.

13. In apparatus of the class described, the combination of a support, a pair of members rotatably mounted on said support, means for oscillating one of said members, devices operatively connected together and slidably carried by said oscillatable member and said support, respectively, and a cam arranged to engage one of said devices and control their engagement and disengagement with the other member, whereby the latter is alternately connected to said support and said oscillatable member.

14. In apparatus of the class described, the combination of a support, a pair of members rotatably mounted on said support, means for oscillating one of said members, devices operatively connected together and slidably carried by said oscillatable member and said support, respectively, and a pivoted cam arranged to engage one of said devices and control their engagement and disengagement with the other member, whereby the latter is alternately connected to said support and said oscillatable member.

15. In apparatus of the class described, the combination of a support, a tool, a pair of members rotatably mounted on said support, means for reciprocating said support and for oscillating one of said members, an annulus carried by the other member, said annulus being formed with series of notches, a pair of dogs carried by said support and oscillatable member, respectively, and each arranged to engage successfully the notches in said annulus, and means for controlling the operation of said dogs to permit their alternate engagement with said notches.

16. In apparatus of the class described, the combination of a support, a tool, slide on said support, a pair of members rotatably mounted on said slide, means for moving said slide and for oscillating one of said members to roll the latter relative to said tool, and means operating alternately to connect the other member to said oscillating member and said slide, to permit relative movement between said members.

17. In apparatus of the class described, the combination of a support, a tool, a slide on said support, a pair of members rotatably mounted on said slide, one of said members being arranged to carry a blank, means for reciprocating said slide and for oscillating said other member, a pair of connected devices carried respectively by said oscillatable member and said slide, and means for controlling said devices to alternately engage the blank carrying member.

18. In apparatus of the class described, the combination of a support, a slide movably mounted on said support, a pair of members rotatably mounted on said slide, one of said members being arranged to carry a blank, means for oscillating the other member, a tool arranged to engage the blank carried by the blank carrying member, devices operatively connected together and slidably carried by said oscillatable member and said slide, respectively, and means arranged to engage one of said devices and control their engagement with and disengagement from said blank carrying member, whereby the latter is alternately connected to said slide and said oscillatable member.

19. In apparatus of the class described, the combination of a support, a slide movably mounted on said support, a pair of members rotatably mounted on said slide, one of said members being arranged to carry a blank, means for oscillating the other member and for reciprocating said slide, an annulus carried by said blank carrying member, said annulus being formed with inner and outer series of notches, a pair of dogs slidably carried by and movable radially of said slide and oscillatable member, respectively, and each arranged to engage successively one series of notches in said annulus, and means for controlling the operation of said dogs to permit their alternate engagement with said series of notches.

20. In apparatus of the class described, the combination of a support, a pair of members rotatably mounted on said support, one of said members being arranged to carry a blank, means for oscillating the other member, an annulus carried by the blank carrying member and formed with series of notches, the notches in each series corresponding in number to the number of teeth on the blank, devices connected together and slidably carried by said oscillatable member and said support, respectively, and an element arranged to engage one of said devices and control their engagement and disengagement with the notches of said annulus, whereby the blank carrying member is alternately connected to said support and said oscillatable member.

21. In apparatus of the class described, the combination of a support, a pair of members rotatably mounted on said support, means for oscillating one of said members, a lock member carried by the other member, a pair of dogs carried by said oscillatable member and said support and arranged to alternately engage said lock member, and a controlling member disposed on said support in the path of movement of the dog carried by said oscillatable member and arranged to disengage the dog from said lock member as it moves in one direction and to move the other dog into engagement therewith.

22. In apparatus of the class described, the combination of a support, a pair of members rotatably mounted on said support, a notched element carried by one of said members, means for oscillating the other member, a dog slidably mounted on said oscillatable member and arranged successively to engage the notches of said element to connect said members together, and means operating during movement of the oscillatable member in one direction to disengage said dog from one of said notches and position it for engagement with the next notch.

23. In apparatus of the class described, the combination of a support, a pair of members rotatably mounted on said support, a notched element carried by one of said members, means for oscillating the other member, a dog slidably mounted on said oscillatable member and arranged successively to engage said notches of said element to connect said members together, means operating during movement of the oscillatable member in one direction to disengage said dog from one of said notches and position it for engagement with the next notches, and means for locking the notched element carrying member against movement while said dog is disengaged from said element.

24. In apparatus of the class described, the combination of a frame, a support slidably mounted on said frame, a pair of members mounted on said support to rotate together and relative to each other, and means for causing relative movement between said members, said means comprising a notched element carried by one of them, means for oscillating the other member, a dog movably mounted on said oscillatable member and arranged successively to engage the notches of said element to connect said members together, and means carried by said support and operating during each movement of the oscillatable member in one direction to trip said dog, whereby it is disengaged from one of said notches and position it for engagement with the next notch.

25. In apparatus of the class described, the combination with a frame, of a tool carried thereby, a pair of supporting members, one of which carries a work piece, means for causing relative translatory movement between said tool and members and oscillatory movement of said members, and means for locking one of said members against movement intermediate the ends of oscillatory movement of the other member to effect relative movement therebetween.

26. In apparatus of the class described, the combination with a frame, of a tool carried thereby, a pair of supporting members, one of which carries a work piece, means for causing relative translatory movement between said tool and members and oscillatory movement of said members, and a pair of elements co-acting with one of said members to lock it against oscillatory movement thereof intermediate the ends of oscillatory movement of the other member to effect relative movement between said members.

27. In apparatus of the class described the combination with a frame, of a tool carried thereby, a pair of supporting members one of which carries a work piece, means for causing translatory and oscillatory movements of said members, and means for locking said work-piece carrying member against oscillatory movement intermediate the ends of oscillatory movement of the other member to effect relative movement therebetween.

28. In a gear generating machine, the combination with a frame, of a rotatable tool, a plurality of supporting elements, one slidably engaging said frame and the remaining elements being rotatively mounted on said slidable element and carrying a gear, means connected to one of said elements and operating to cause a rolling movement of the gear into and out of engagement with said tool, and devices carried by said supporting elements and actuated by the relative movements between said rotative and slidable elements to lock one of said rotatively mounted elements to said slidable element during rotary movement of the other rotatively mounted element to effect indexing of the gear.

In testimony whereof I affix my signature.

CHARLES H. SCHURR.

DISCLAIMER.

1,467,985.—*Charles H. Schurr*, Cleveland, Ohio. INDEXING MECHANISM. Patent dated September 11, 1923. Disclaimer filed October 12, 1927, by the assignee, *The Lees-Bradner Company.*

Hereby enters this disclaimer to that part of the claim in said patent which is in the following words, to wit:

"1. In apparatus of the class described, the combination of a support, a work spindle rotatably mounted on said support, a tool, means for causing relative movement between said tool and work spindle support, means for rotating said work spindle in opposite directions, and means carried entirely by said work spindle support for indexing said work spindle."

"5. In apparatus of the class described, the combination of a tool, a support, a pair of connected members rotatably mounted on said support, means for rolling said members relative to said tool, one of said members carrying a work piece, and means operating periodically to disconnect the work piece carrying member from said other member and connect it to said support, to permit relative movement between said members."

"22. In apparatus of the class described, the combination of a support, a pair of members rotatably mounted on said support, a notched element carried by one of said members, means for oscillating the other member, a dog slidably mounted on said oscillatable member and arranged successively to engage the notches of said element to connect said members together, and means operating during movement of the oscillatable member in one direction to disengage said dog from one of said notches and position it for engagement with the next notch."

"24. In apparatus of the class described, the combination of a frame, a support slidably mounted on said frame, a pair of members mounted on said support to rotate together and relative to each other, and means for causing relative movement between said members, said means comprising a notched element carried by one of them, means for oscillating the other member, a dog movably mounted on said oscillatable member and arranged successively to engage the notches of said element to connect said members together, and means carried by said support and operating during each movement of the oscillatable member in one direction to trip said dog, whereby it is disengaged from one of said notches and position it for engagement with the next notch."

*[Official Gazette November 1, 1927.]*